United States Patent
Yousefi et al.

(10) Patent No.: US 10,108,270 B2
(45) Date of Patent: Oct. 23, 2018

(54) REAL-TIME 3D GESTURE RECOGNITION AND TRACKING SYSTEM FOR MOBILE DEVICES

(71) Applicant: MANOMOTION AB, Stockholm (SE)

(72) Inventors: Shahrouz Yousefi, Bromma (SE); Haibo Li, Taby (SE); Farid Abedan Kondori, Spanga (SE)

(73) Assignee: MANOMOTION AB, Stockholm (SE)

( * ) Notice: Subject to any disclaimer, the term of this patent is extended or adjusted under 35 U.S.C. 154(b) by 258 days.

(21) Appl. No.: 15/109,524

(22) PCT Filed: Dec. 22, 2014

(86) PCT No.: PCT/SE2014/051562
§ 371 (c)(1),
(2) Date: Jul. 1, 2016

(87) PCT Pub. No.: WO2015/102527
PCT Pub. Date: Jul. 9, 2015

(65) Prior Publication Data
US 2016/0334877 A1    Nov. 17, 2016

Related U.S. Application Data
(60) Provisional application No. 61/923,687, filed on Jan. 5, 2014.

(51) Int. Cl.
*G06F 3/01* (2006.01)
*G06K 9/00* (2006.01)
*G06F 3/00* (2006.01)
*G06K 9/48* (2006.01)

(52) U.S. Cl.
CPC .............. *G06F 3/017* (2013.01); *G06F 3/005* (2013.01); *G06K 9/00335* (2013.01); *G06K 9/00389* (2013.01); *G06K 9/48* (2013.01)

(58) Field of Classification Search
None
See application file for complete search history.

(56) References Cited

U.S. PATENT DOCUMENTS 6,128,003 A * 10/2000 Smith ................ G06K 9/00355
345/156
6,256,033 B1 * 7/2001 Nguyen .................. G06F 3/017
345/156

(Continued)

OTHER PUBLICATIONS

3D Gesture Analysis Using a Large-Scale Gesture Database, Shahrouz Yousefi, Haibo Li, Li Liu, Advances in Visual Computing: 10$^{th}$ International Symposium ISVC 2014, Part I, pp. 206-217.*

(Continued)

*Primary Examiner* — Patrick Moon
*Assistant Examiner* — Peijie Shen
(74) *Attorney, Agent, or Firm* — Young & Thompson

(57) ABSTRACT

The disclosure relates to a device and a method in the device for recognizing a 3D gesture. The device is connected to a sensor and has access to a database of gesture images including indexable features of normalized gesture images. The indexable features include a position and an orientation for each pixel of edge images of the normalized gesture images. The method includes capturing (110) an image of the 3D gesture via the sensor, normalizing (120) the captured image, deriving (130) indexable features from the normalized captured image, and comparing (140) the derived indexable features with the indexable features of the database using a similarity function. The method also includes determining (150) a gesture image in the database matching the 3D gesture based on the comparison.

20 Claims, 14 Drawing Sheets

(56) References Cited

U.S. PATENT DOCUMENTS

| | | | | |
|---|---|---|---|---|
| 6,788,809 | B1* | 9/2004 | Grzeszczuk | G06F 3/017 345/419 |
| 7,050,606 | B2* | 5/2006 | Paul | G06F 3/017 348/154 |
| 9,002,099 | B2* | 4/2015 | Litvak | G06K 9/00382 345/653 |
| 9,122,916 | B2* | 9/2015 | Fujimura | G06K 9/44 |
| 9,734,393 | B2* | 8/2017 | Wang | G06F 3/011 |
| 2003/0161508 | A1* | 8/2003 | Lindahl | G09B 21/003 382/123 |
| 2007/0098239 | A1* | 5/2007 | Zhou | G06K 9/00335 382/128 |
| 2007/0152057 | A1* | 7/2007 | Cato | G01S 17/48 235/462.01 |
| 2010/0194679 | A1* | 8/2010 | Wu | G06K 9/00375 345/156 |
| 2012/0070070 | A1* | 3/2012 | Litvak | G06K 9/00201 382/154 |

OTHER PUBLICATIONS

Edgel Index for Large-Scale Sketch-based Image Search, Yang Cao, Changhu Wang, Liqing Zhang, Lei Zhang, Proceedings of the IEEE Conference on Computer Vision and Pattern Recognition (CVPR), Colorado Springs, USA, pp. 761-768 (2011).*

International Preliminary Report on Patentability PCT/SE2014/051562 dated Apr. 18, 2016.

Shahrouz et al.: "3D Gesture Analysis Using a Large-Scale Gesture Database", Dec. 8, 2014, Correct System Design; [Lecture Notes in Computer Science; Lect. Notes Computer], Springer International Publishing, XP047297108.

Ballard et al.: "Generalizing the Hough Transform to Detect Arbitrary Shapes", Pattern Recognition, vol. 13, No. 2, Jan. 1, 1981, pp. 111-122, XP055089257.

Written Opinion of the International Preliminary Examining Authority PCT/SE2014/051562 dated Dec. 9, 2015.

Freeman et al.: "Orientation Histograms for Hand Gesture Recognition", Technical Report Mitsubishi Electric Research Laboratories, Dec. 1, 1994, pp. 1-8, XP007900112.

* cited by examiner

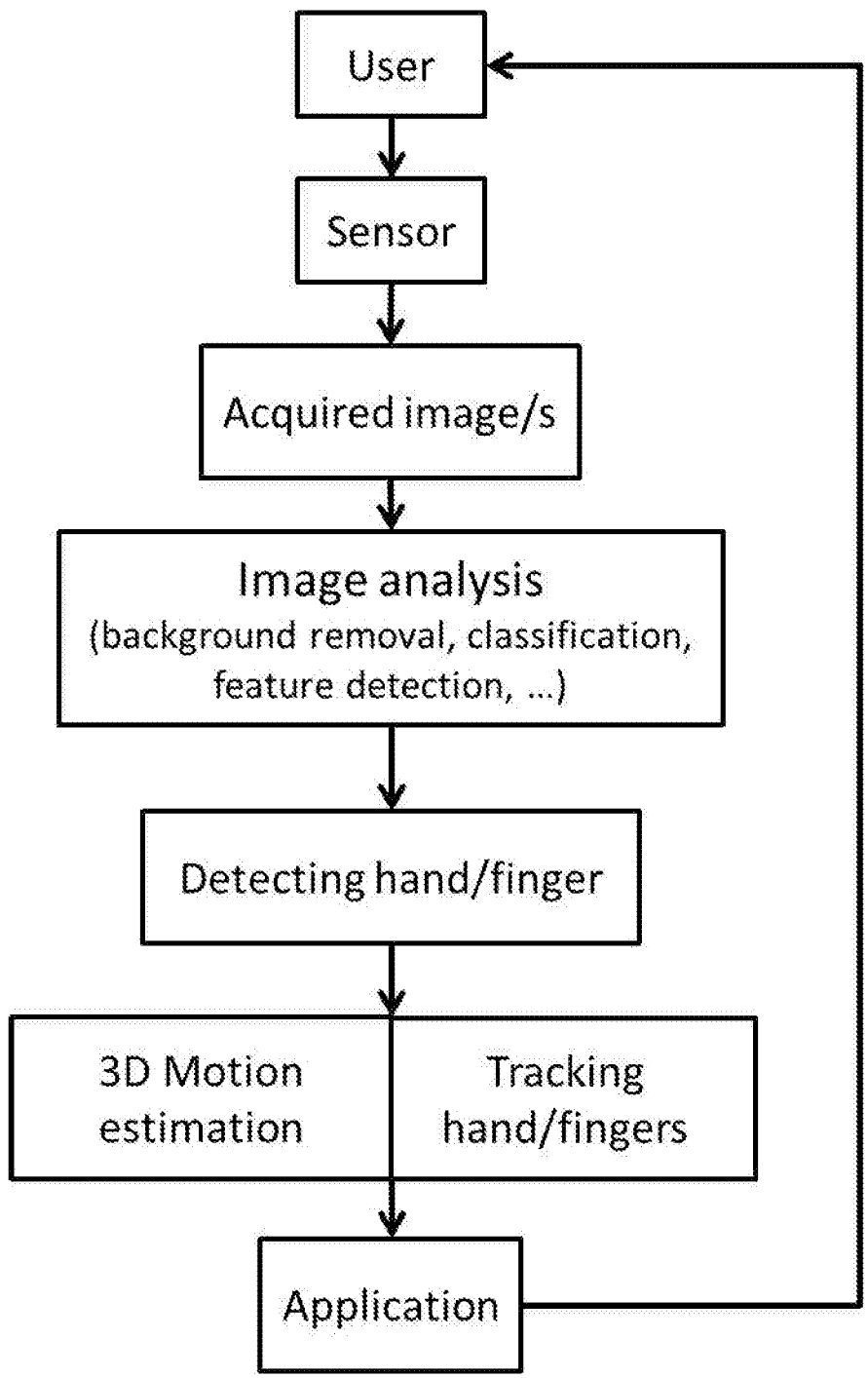
Fig.1- Prior art

REAL-TIME 3D GESTURE RECOGNITION AND TRACKING SYSTEM FOR MOBILE DEVICES

TECHNICAL FIELD

The disclosure relates to gesture recognition, and more specifically to a device and a method for recognizing a 3D gesture.

BACKGROUND

The human hand has 27 degrees of freedom (DoF): four in each finger, three for extension and flexion and one for abduction and adduction; the thumb is more complicated and has five DOF, leaving six DOF for the rotation and translation of the wrist. Capturing hand and finger motion in video sequences is a highly challenging task due to the large number of DoF of the hand kinematics. This process is even more complicated on hand-held smart devices due to the limited power and expensive computations.

Basically the common existing solutions follow the steps illustrated in FIG. 1. The query image sequence captured by sensor/s will be analyzed to segment user hand/fingers. Image analysis algorithms, such as background removal, classification, feature detection etc. are utilized to detect hand/fingers. In fact, existing algorithms of hand tracking and gesture recognition can be grouped into two categories: appearance based approaches and 3D hand model based approaches (US2010053151A1, US2010159981A1, WO2012135545A1, and US2012062558A1). The former are based on a direct comparison of hand gestures with 2D image features. The popular image features used to detect human gestures include hand colors and shapes, local hand features and so on. The drawback of feature-based approaches is that clean image segmentation is generally required in order to extract the hand features. This is not a trivial task when the background is cluttered, for instance. Furthermore, human hands are highly articulated. It is often difficult to find local hand features due to self-occlusion, and some kinds of heuristics are needed to handle the large variety of hand gestures. Instead of employing 2D image features to represent the hand directly, 3D hand model based approaches use a 3D kinematic hand model to render hand poses. An analysis-by-synthesis (ABS) strategy is employed to recover the hand motion parameters by aligning the appearance projected by the 3D hand model with the observed image from the camera. Generally, it is easier to achieve real-time performance with appearance-based approaches due to the fact of simpler 2D image features. However, this type of approaches can only handle simple hand gestures, like detection and tracking of fingertips. In contrast, 3D hand model based approaches offer a rich description that potentially allows a wide class of hand gestures. The main challenging problem is that 3D hand is a complex 27 DoF deformable model. To cover all the characteristic hand images under different views, a very large database is thus required. Matching the query images from the video input with all hand images in the database is time-consuming and computationally expensive. This is why most existing 3D hand model based approaches focus on real-time tracking for global hand motions with restricted lighting and background conditions.

SUMMARY

It is an object to address some of the problems outlined above, and to provide a solution for computational efficient real-time gesture recognition. This object and others are achieved by the method and the device according to the independent claims, and by the embodiments according to the dependent claims.

In accordance with a first aspect, a method for recognizing a 3D gesture is provided. The method is performed in a device having access to a database of gesture images. The device communicates with a sensor adapted to capture an image of the 3D gesture. The database of gesture images comprises indexable features of normalized gesture images. The indexable features comprise a position and an orientation for each pixel of edge images of the normalized gesture images. The method comprises capturing an image of the 3D gesture via the sensor, and normalizing the captured image in accordance with the normalized gesture images of the database. The method also comprises deriving indexable features from the normalized captured image. The indexable features comprise a position and an orientation for each pixel of an edge image of the normalized captured image. The method further comprises comparing the derived indexable features with the indexable features of the database using a similarity function, and determining a gesture image in the database matching the 3D gesture based on the comparison.

In accordance with a second aspect, a device for recognizing a 3D gesture is provided. The device is configured to have access to a database of gesture images comprising indexable features of normalized gesture images. The indexable features comprise a position and an orientation for each pixel of edge images of the normalized gesture images. The device is connectable to a sensor adapted to capture an image of the 3D gesture. The device comprises a processing unit. The processing unit is adapted to capture the image of the 3D gesture via the sensor, normalize the captured image in accordance with the normalized gesture images of the database, and derive indexable features from the normalized captured image. The indexable features comprise a position and an orientation for each pixel of an edge image of the normalized captured image. The processing unit is also adapted to compare the derived indexable features with the indexable features of the database using a similarity function. The processing unit is further adapted to determine a gesture image in the database matching the 3D gesture based on the comparison.

An advantage of embodiments is that high resolution gesture recognition is made possible in real time with less computational resources.

Other objects, advantages and features of embodiments will be explained in the following detailed description when considered in conjunction with the accompanying drawings and claims.

BRIEF DESCRIPTION OF THE DRAWINGS

FIG. 1 is a flow diagram schematically illustrating a method for gesture tracking and recognition according to prior art.

DETAILED DESCRIPTION

Figure 2A:
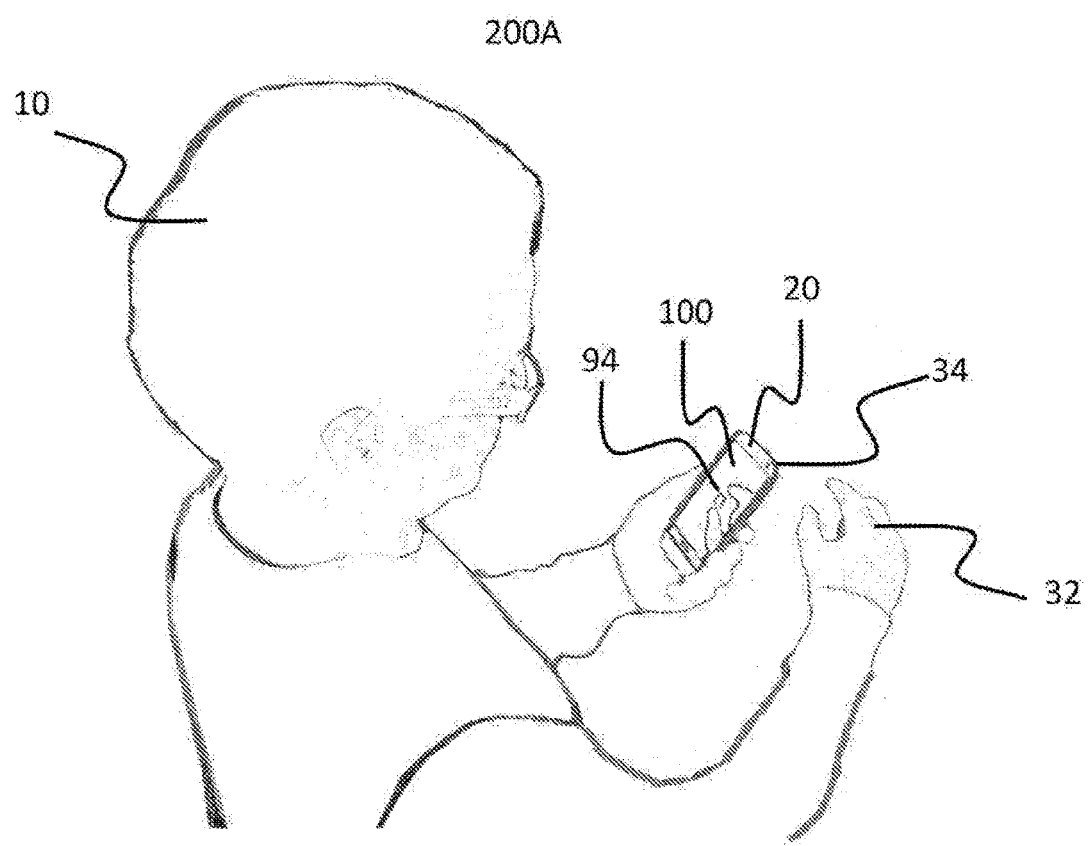
FIG. 2A is a schematic, pictorial illustration of a 3D user interface system in mobile platform, in accordance with embodiments of the present invention.

Overview 3D gesture recognition is a highly desired feature in interaction design between human and future mobile devices. Specifically, in virtual or augmented reality environments, intuitive interaction with the physical world seems unavoidable and 3D gestural interaction might be the most effective alternative for the current input facilities such as track pads and touchscreens. In embodiments of the invention, a solution for 3D gesture recognition and tracking is provided. The proposed methodology and system are based on a match finding in an extremely large gesture database. This database includes captured entries of various types of hand gestures with all the possible variations in rotations and positioning and the corresponding position/orientation parameters. A similarity analysis of the attributes between the query inputs and database entries is performed. The system retrieves the match including the database entry and the annotated information for the acquired query input.

Unlike the classical computer vision approaches that requires great amount of power, computation and memory, a new framework is defined to solve the same problem but using a totally different approach. The proposed technology can handle the complexity of e.g. the high DoF hand motion with a large-scale search framework, whereas the current technology is limited to low resolution gesture recognition and tracking.

For general mobile device applications, full range of hand/body gestures need to be covered. To handle the challenging exhaustive search problem in high dimensional space of human gestures, an efficient indexing algorithm for large-scale search on gesture images is proposed. The advantage of the disclosed system is the extremely fast retrieval on huge number of database images that can handle the high DoF hand motion in various lighting conditions, with the presence of noise and clutter. The solution is adapted to the special requirements for mobile applications, like real-time, low-complexity and robustness as well as the high resolution tracking and accuracy.

According to embodiments of the invention, any mobile, wearable, or stationary device equipped with vision sensors or other type of sensors such as a mobile camera, a web-cam, a depth sensor, or an ultra-sound sensor, is enabled to determine or recognize human gestures e.g. hand, head, or body gesture in 3D space. Gesture tracking is performed using the determined or recognized gestures in a sequence of query inputs. The recognition and tracking is based on an advanced search system searching in an extremely large database (DB) of annotated gesture entries. The database includes all the possible hand gestures with all the deformations and variations in 3D space, which may correspond to millions of entries. At each moment, for any query gesture, the proposed system automatically searches through the database and retrieves the best match. This will result in real-time 3D gesture tracking. The technology facilitates the user-device interaction in real-time applications where intuitive 3D interaction might be used. Embodiments of the invention are designed to support the interaction on mobile/wearable devices such as smartphones and augmented reality glasses. It can also be used for stationary, mobile, and other digital devices.

Figure 3:
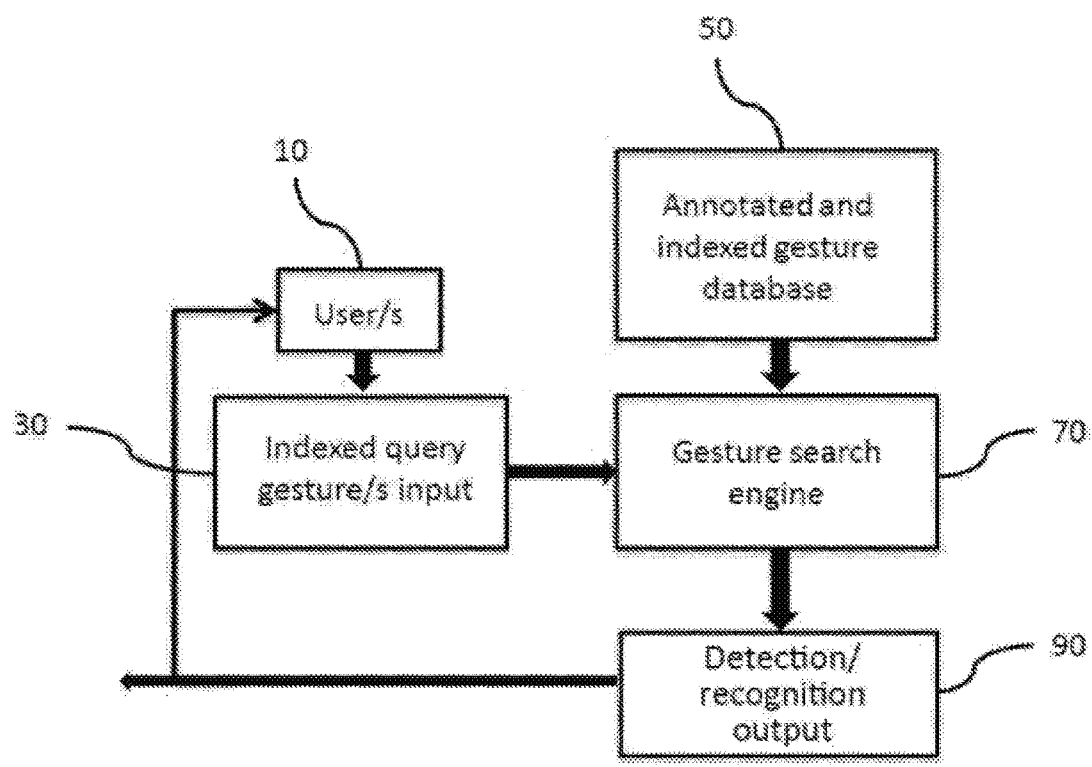
FIG. 3 is schematically illustrating a method and the system according to embodiments of the present invention.

FIG. 3 illustrates an embodiment of the present invention, including a methodology and a system applicable to smartphones, mobile devices, wearable smart devices, stationary systems and digital gadgets. It includes four main components: the pre-processed annotated and indexed gesture database 50, image query processing unit 30 that receives a query gesture, a real-time gesture search engine 70 that receives the query gestures and automatically retrieves the best match from the database of gestures, and finally, the interface level 90 that receives the output of the search engine and applies that to the ongoing application. The required hardware platform is any digital device.

System Description

FIG. 2A is a schematic illustration of a 3D user interface system 200A, in accordance with an embodiment of the present invention. The user interface is based on a smart device 20 of any kind (mobile, stationary, wearable etc.) equipped with sensor/s of any type 34 (e.g. 2D/3D camera, ultra sonic, 3D depth camera, IR camera), which captures 3D scene information behind, in front of, and/or around the device 20, that includes a gesture 32, e.g. hand, head, or body gesture of a human user 10. In order to detect/recognize the gesture 32 (hand/head/body gesture), smart device 20 captures the gesture images with sufficient resolution to enable the gesture 32 (hand/head/body gesture) and its specific position and orientation to be extracted. A position represents spatial coordinates of a gesture center(x, y) in the image plus gesture scale (distance from sensor in z), and orientation is the relative orientation of the hand gesture with regards to the sensor's 3D coordinates (x,y,z). In addition to gesture 32 (hand/head/body gesture), captured image or query image 33 typically includes other body parts and/or cluttered background.

In FIG. 2A system 200A captures and processes a sequence of query images 33 containing user's gesture 32 (hand/head/body gesture). While the user 10 performs a gesture 32 (hand/head/body gesture), system 200A tracks user's gesture 32 (hand/head/body gesture) over the sequence of query images 33. Software running on a processing unit 24 in device 20 and/or capturing sensor 34 processes the image sequence to retrieve indexable features 36 of user gestures 32 in each query image 33, as explained in detail herein below. The software matches the extracted indexable features 36 to large-scale vocabulary table of indexed features 72 in order to find the best match for the query images 33, as explained in detail herein below. The large scale vocabulary table is a large-scale matrix of indexable features from database images.

Database 52 is composed of millions of images of hand gestures. Hand gesture images are annotated with specific 3D motion parameters (three position and three orientation parameters) 58, as explained in detail herein below. Finding the best hand gesture image in database 52 for the query input 33 provides 3D motion parameters of the query input 33.

The method illustrated in FIG. 5 also analyzes gesture maps 73 over multiple frames in the sequence in order to optimize, and speed up the search process, as described herein below.

Figure 5:
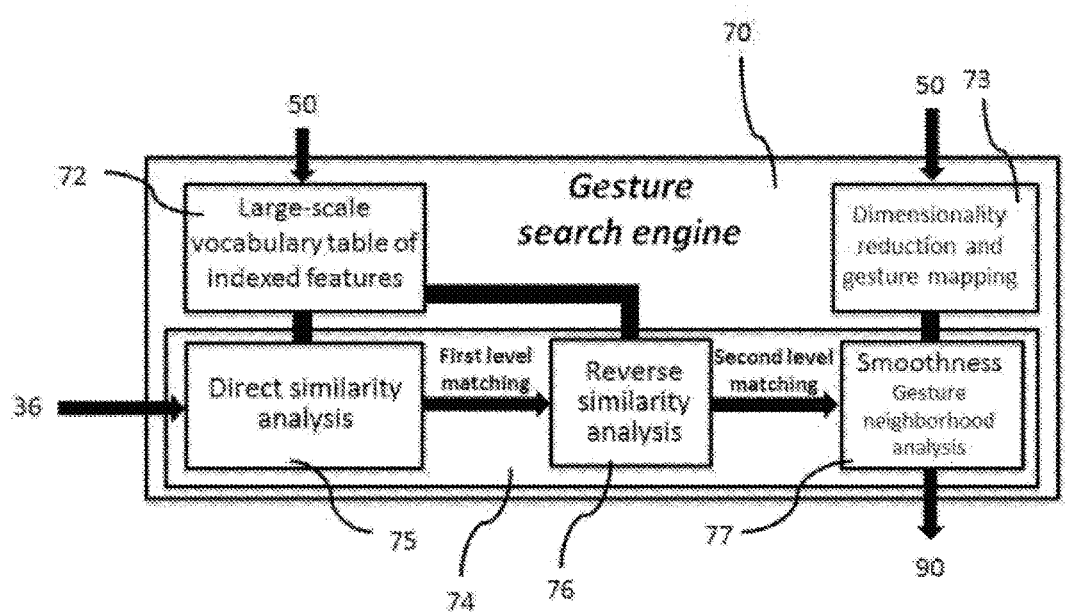
FIG. 5 is a flow chart schematically illustrating a method for searching the gesture entries and finding the match for a query input according to embodiments of the present invention.

The system may also include motion tracking functions to track user gestures 32 over a sequence of query inputs 33, so that the method illustrated in FIG. 5 may optionally be performed only once in every two (or more) frames Detected/recognized output/s (action/gesture/3D motion, annotated image, . . . ) 92 is provided via Application Programming Interface (API) to an application program running on device 20. This program may, for example, move and modify images, 3D objects, or other 2D/3D visual content 94 presented on display 100 in response to the performed gesture/s 32.

As an alternative, all or some of these processing functions may be carried out by a suitable processor that is integrated with any other computerized device, such as a game console, media player, smart TVs etc. Any computerized apparatus equipped by capture sensor 34 (2D/3D camera, IR sensor, ultra sonic etc.), storing unit 22, and processing unit 24, can utilize at least some of the mentioned functions to provide better user interface system.

Providing the Database of Gesture Images

Figure 4:
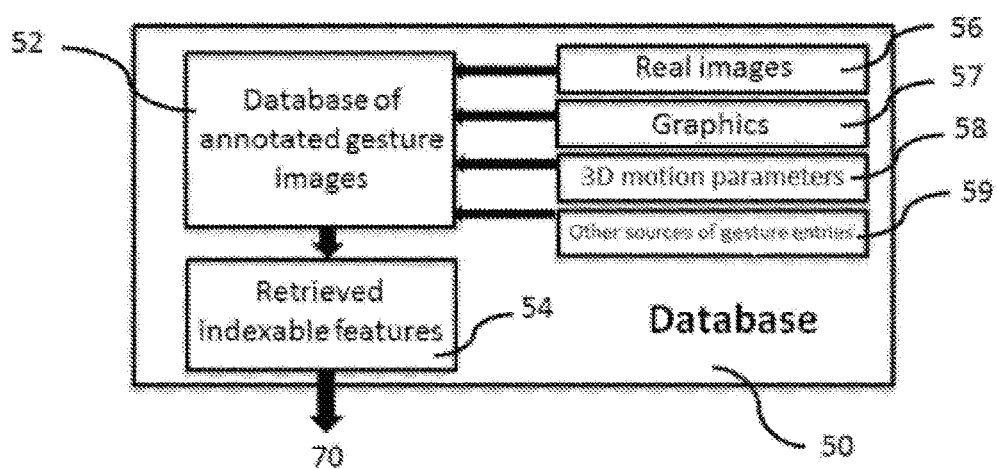
FIG. 4 is a flow chart schematically illustrating a method for storing gesture entries in a database according to embodiments of the present invention.

FIG. 4 is a diagram of the method 50 for forming the indexable features 54 of the database of annotated gesture images 52. The database contains a large set of different real images 56 of hand gesture entries with all the potential variations in orientation, positioning and scaling. It can also include all hand gestures graphics 57 synthesized by 3D articulated hand models/3D graphical models etc. with known position and orientation parameters.

Besides the matching between the query input 33 and database, one important feature that is aimed to achieve is to retrieve the 3D motion parameters (three position and three orientation parameters corresponding to the three dimensions) from the query input 33. Since query inputs 33 do not contain the 3D motion parameters (three orientation and three position parameters), the best solution is to associate the 3D motion parameters (three orientation and three position parameters) of the query input 33 to the best retrieved match from the database. For this reason, the database entries are tagged with their ground-truth 3D motion parameters (three orientation and three position parameters) 58. This can be done by means of any motion capture system, like vision-based systems, magnetic sensors, IMUs etc. Other sources of gesture entries 59 are also being used to expand the database. Tagging the 3D motion parameters (three orientation and three position parameters) to hand gesture images, a database of annotated gesture images 52 is formed. Each entry in the database of annotated gesture images 52 represents pure gesture entries (background and noise free). The method 50 extracts indexable features 54 of each entry in the database of annotated gesture images 52. Indexable features 54 include low-level edge orientation attributes including the exact position and orientation of the edge pixels derived from the entries in the database of annotated gesture images 52. If each single edge pixel is considered as a small line on the 2D image coordinates, orientation of the edge pixel is the angle of this small line with respect to the origin of the image coordinates. Technically, it can be computed from gradient of the image with respect to x and y directions.

In order to extract indexable features 54, all the entries in the database of annotated gesture images 52 will be normalized and their corresponding edge images are computed. An edge image may be computed by filtering the gesture image. Different edge detectors are known in the computer vision field and can be used as well. Each single edge pixel will be represented by its position and orientation. In order to make a global structure for low-level edge orientation features, a large-scale vocabulary table 72 is formed to represent all the possible cases that each edge feature might happen. Considering the whole database with respect to the position and orientation of the edges, a large-scale vocabulary table 72 can represent the whole vocabulary of the gestures in edge pixel format. An edge pixel format is a representation of each pixel of an edge image in terms of its position and orientation.

Image Query Processing

Figure 6:
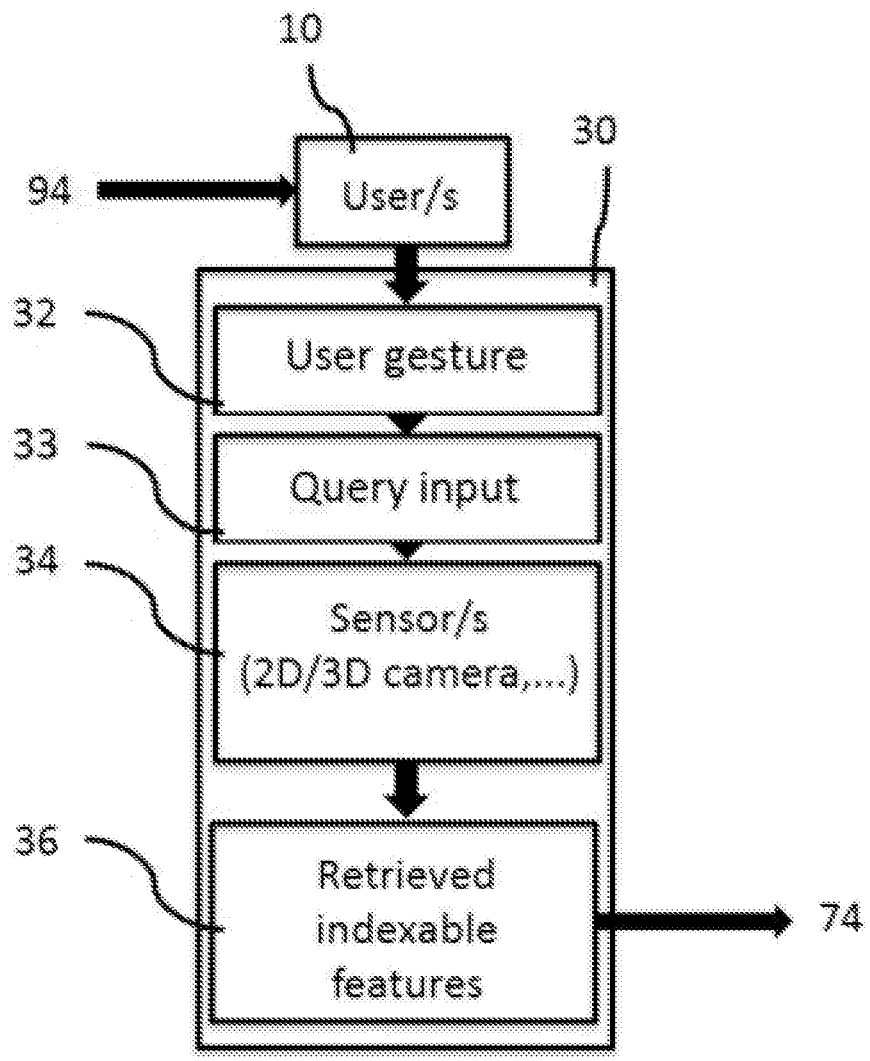
FIG. 6 is a flow chart schematically illustrating a method for image query processing according to embodiments of the present invention.

FIG. 6 is a diagram that schematically illustrates the method for image query processing 30. A query input 33 features a gesture 32 (hand/head/body gesture) of user 10 with its specific three position and three orientation parameters captured by the sensor/s 34 (2D/3D camera, IR sensor, ultra sonic etc.). Sensor/s 34 captures 3D scene information behind or in front of the device 20. Smart device 20 captures a sequence of query inputs 33 and processes them to retrieve indexable features 36. The method 30 extracts indexable features 36 from the query inputs 33. Indexable features 36 include low-level edge orientation attributes including the exact position and orientation of the edge pixels derived from the query inputs 33.

In order to extract indexable features 36, query input 33 will be normalized and their corresponding edge images are computed. Each single edge pixel will be represented by its position and orientation.

Basically, query input 33 that captures user gesture 32 (hand/head/body gesture), contains cluttered background caused by irrelevant objects, environmental noise, etc. thus, retrieved indexable features 36 from query inputs 33 contains both features from gestures 32 and noisy background. On the other hand, each entry in the database of annotated gesture images 52 represents pure gesture entries (background and noise free), thus, retrieved indexable features 54 from each entry in the database of annotated gesture images 52 only represents the features from the pure gestures. Therefore the edge image of the query image cannot be defined as exact as the edge images of the database images.

Gesture Search Engine

FIG. 5 illustrates the method for gesture search engine 70. Extracted indexable features 54 of each entry in the database of annotated gesture images 52 build a large-scale vocabulary table of indexable features 72 in gesture search engine 70.

Large-scale vocabulary table of indexed features 72 is formed to represent all the possible cases that each edge feature might happen. Considering the whole database with respect to the position and orientation of the edges, a large-scale vocabulary table 72 can represent the whole vocabulary of the gestures in edge pixel format. For instance, for image size of p*q pixel, and L edge orientation representation, for a database of N images of gestures, the vocabulary table 72 will have p*q*L columns and N rows. Therefore, the vocabulary table 72 is filled with the indices of all database images 52 that have features at the specific rows and columns. The Vocabulary table 72 collects the required information from the whole database 52, which is essential in the method for gesture search engine 70.

In order to detect/recognize user gesture 32 in query image 33, large-scale search table 72 and retrieved indexable features 36 of each query image 33 are utilized by direct similarity analysis function 75 to select top m first level matches in the database of annotated gesture images 52.

Each query input 33 in edge pixel format contains a set of edge points that can be represented by the row-column positions and specific orientation. Direct similarity function analysis 75 computes the similarity of the retrieved indexable features 36 of the query input 33 with the large-scale vocabulary table of indexed features 72 based on the positions and specific orientations of all the edge features. The direct similarity analysis function is a function that assigns a score to a pair of data values, where the score indicates the similarity of the indexed features of the query to indexed features of each entry in the database. If the certain condition is satisfied for the retrieved indexable features 36 in the query input 33 and retrieved indexable features 54 of the database of annotated gesture images 52, the direct similarity analysis function 75 assigns +K1 points to all the database images 52 that have an edge with similar direction at those specific row-column positions. Direct similarity analysis function 75 performs the mentioned process for each single edge pixel format of the query input 33.

The first step of direct similarity analysis function 75 satisfies the case where two edge patterns from the query input 33 and database images 52 exactly cover each other, whereas in most real cases two similar patterns are extremely close to each other in position but there is not a large overlap between them. For these cases that regularly happen, the direct similarity analysis function 75 assigns extra points based on the first and second level neighbor pixels.

A very probable case is when two extremely similar patterns do not overlap but fall on the neighboring pixels of each other. In order to consider these cases, besides the first step of direct similarity analysis function 75, for any single pixel the first level 8 neighboring and second level 16 neighboring pixels in the database images should be considered for assigning extra points. The first level 8 neighboring pixels of any single pixel are the ones that surround the single pixel. The second level neighbors include 16 pixels that are surrounding the first level 8 neighboring pixels. All the database images 52 that have edge with similar direction in the first level and second level neighbors receive +K2 and +K3 points respectively (K1>K2>K3). In short, direct similarity analysis 75 is performed for all the edge pixels in the query with respect to the similarity to the database images in three levels with different weights. Finally, the accumulated score of each database image is calculated and normalized and the maximum scores are selected as the top m first level matches.

In order to find the closest match among the top m first level matches, reverse similarity analysis 76 is performed. Reverse similarity analysis 76 means that besides finding the similarity of the query gesture 32 to the entries of the database of annotated gesture images 52, the reverse similarity of the selected top m entries of the database of annotated gesture images 52 to the query gesture 32 should be computed. The reverse similarity function is used for accuracy reasons. Not using the reverse similarity analysis would give lower accuracy of retrieval, but reduces the complexity.

Reverse similarity analysis 76 returns the best n matches (n<m), from the database of annotated images 52 for the given user gesture 32. Combination of the direct similarity analysis 75 and reverse similarity analysis 76 functions returns the best match from the database of annotated gesture images 52 for the query input 33.

Another optional step in gesture search engine 70 is smoothness of the gesture search by employing gesture neighborhood analysis function 77. Smoothness means that the retrieved best matches in a sequence of 3D gestural interaction should represent the smooth motion. In order to perform a smooth retrieval, entries in the database of annotated gesture images 52 are analyzed and mapped to high dimensional space to detect gesture maps 73. Gesture maps 73 indicate that which gestures are closer to each other and fall in the same neighborhood in high dimension. Therefore, for a query input 33 in a sequence, after performing the direct similarity analysis function 75, the reverse similarity will be computed by reverse similarity analysis function 76 and top matches will be selected. Afterwards, the method 70 searches the gesture maps 73 to check which of these top matches is closer to the previous frame match and the closest entry from the database of annotated images 52 will be selected as the final best match. Afterwards, the tagged 3D motion parameters (three position and three orientation parameters) 58 to the best match can be immediately used to facilitate various application scenarios running on display 100.

Interface

Figure 7:
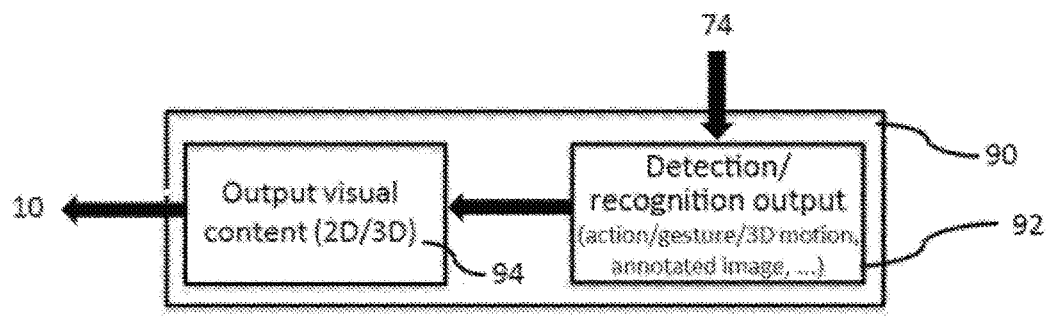
FIG. 7 schematically illustrates a method for interface level according to embodiments of the present invention.

FIG. 7 is a flow chart that schematically illustrates the method for the interface level 90 that receives the detection/recognition output (actions/gesture/3D motion, annotated image etc.) 92 of the search engine 70. Detected/recognized parameters (actions/gesture/3D motion, annotated image etc.) 92 are provided via the application programming interface (API) to an application running on device 20. Application may include 2D/3D video game, 2D/3D object modeling/rendering, photo browsing, map, navigation etc. presented on display 100. User 10 perceives output visual contents (2D/3D) 94 on the display 100 which are continuously being modified in response to user gesture 32 performances.

Detailed Description of Device

Figure 8:
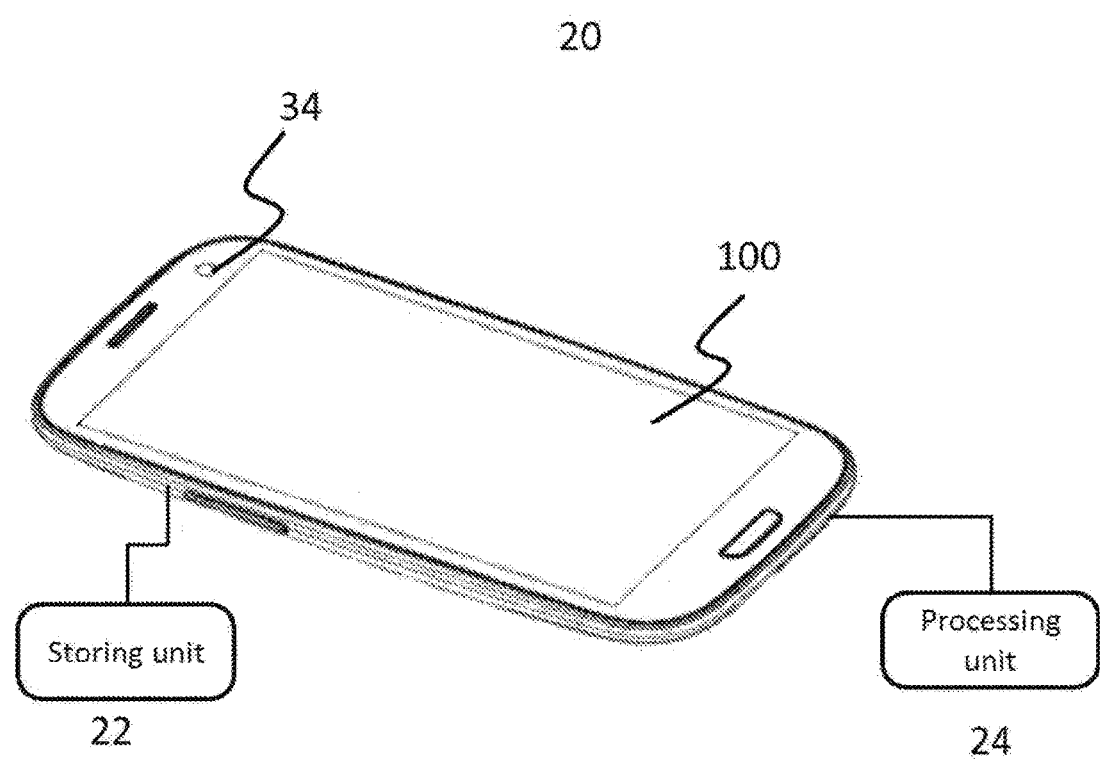
FIG. 8 schematically illustrates a mobile device 20 shown in FIG. 2A according to embodiments.

FIG. 8 illustrates the mobile device 20 shown in FIG. 2A. The mobile device 20 consists of a storing unit 22, a processing unit 24, a sensor 34 (e.g. 2D/3D camera, IR sensor, ultra sonic etc.), and a display 100. The sensor 34 captures 3D scene information in front of the device 20. The mobile device 20 may also include a rear sensor 34 (e.g. 2D/3D camera, IR sensor, ultra sonic etc.) that captures 3D scene information behind the mobile device 20. The mobile device 20 captures a sequence of query inputs 33 and processes them to retrieve indexable features 36. The storing unit 22 stores the database of annotated gesture images 52, large-scale vocabulary table of indexed features 72, and gesture maps 73. The processing unit 24 performs the method for image query processing 30, and the method for the search engine 70. The processing unit 24 also modifies output visual content (2D/3D) 94 presented on the display 100 in response to user gesture 32 performances. The display 100 displays an application running on the mobile device 20. The application may include 2D/3D video game, 2D/3D object modeling/rendering, photo browsing, map, navigation etc. presented on the display 100. The user 10 perceives output visual contents (2D/3D) 94 on the display 100 which are continuously being modified in response to user gesture 32 performances.

Figure 2B:
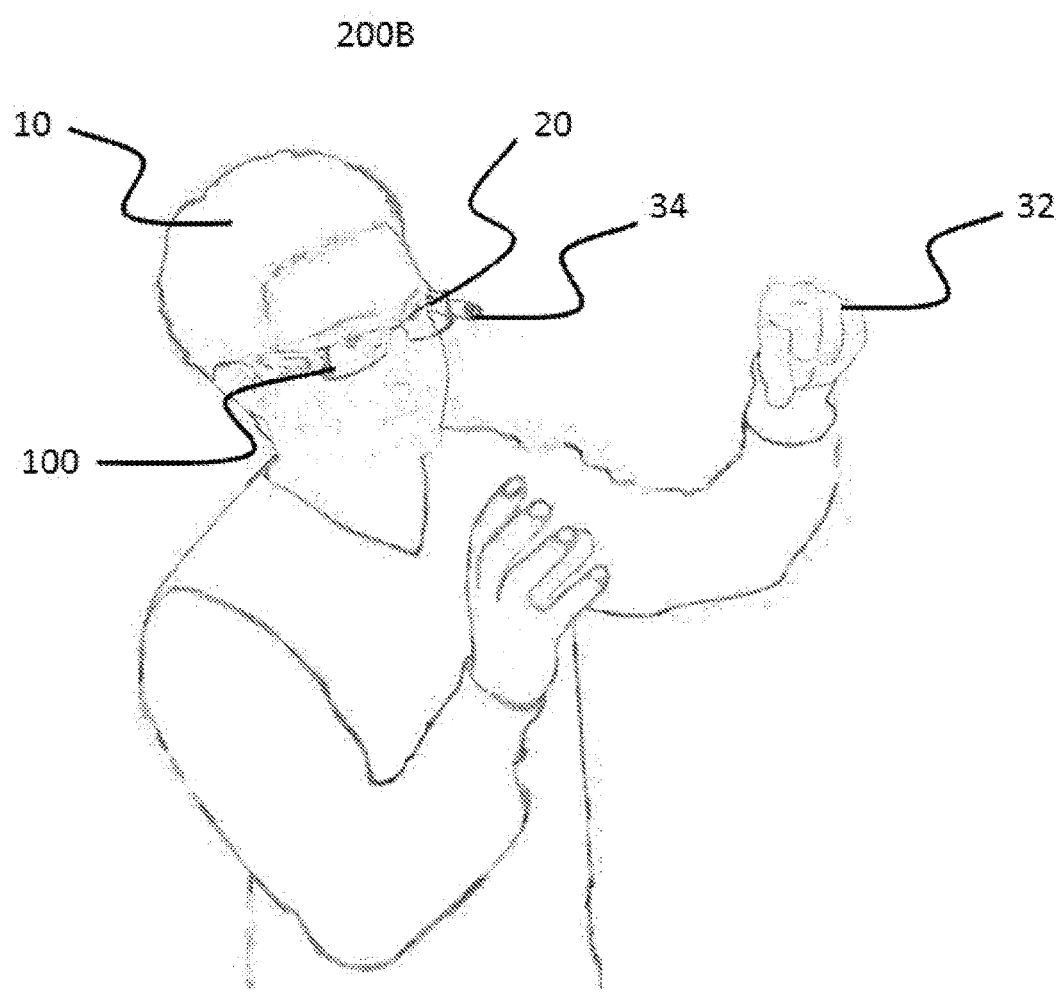
FIG. 2B is a schematic, pictorial illustration of the 3D user interface employing wearable device, in accordance with embodiments of the present invention.
Figure 9:
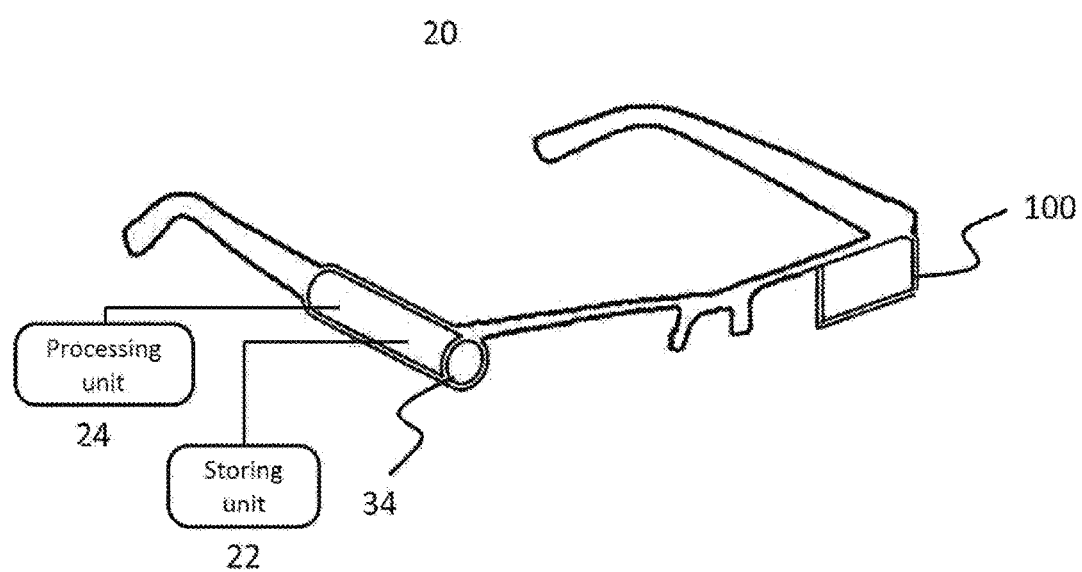
FIG. 9 schematically illustrates a wearable device 20 shown in FIG. 2B according to embodiments.

FIG. 9 illustrates the wearable device 20 shown in FIG. 2B. The wearable device 20 consists of a storing unit 22, a processing unit 24, a sensor 34 (e.g. 2D/3D camera, IR sensor, ultra sonic etc.), and a display 100. The sensor 34 captures 3D scene information in front of the wearable device 20. The wearable device 20 captures a sequence of query inputs 33 and processes them to retrieve indexable features 36. The storing unit 22 stores the database of annotated gesture images 52, large-scale vocabulary table of indexed features 72, and gesture maps 73. The processing unit 24 performs the method for image query processing 30, and the method for the search engine 70. The processing unit 24 also modifies output visual content (2D/3D) 94 presented on the display 100 in response to user gesture 32 performances. The display 100 displays an application running on the wearable device 20. The application may include 2D/3D video game, 2D/3D object modeling/rendering, photo browsing, map, navigation etc. presented on the display 100. The user 10 perceives output visual contents (2D/3D) 94 on the display 100 which are continuously being modified in response to user gesture 32 performances.

Figure 2C:
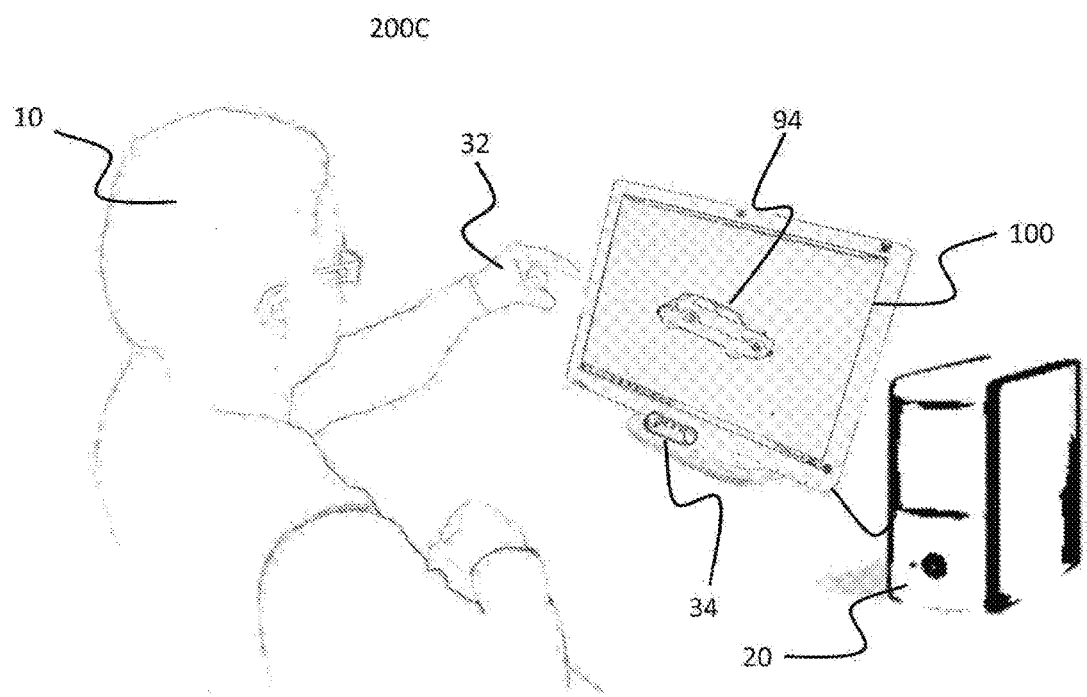
FIG. 2C is a schematic, pictorial illustration of the 3D user interface in stationary platform, in accordance with embodiments of the present invention.
Figure 10:
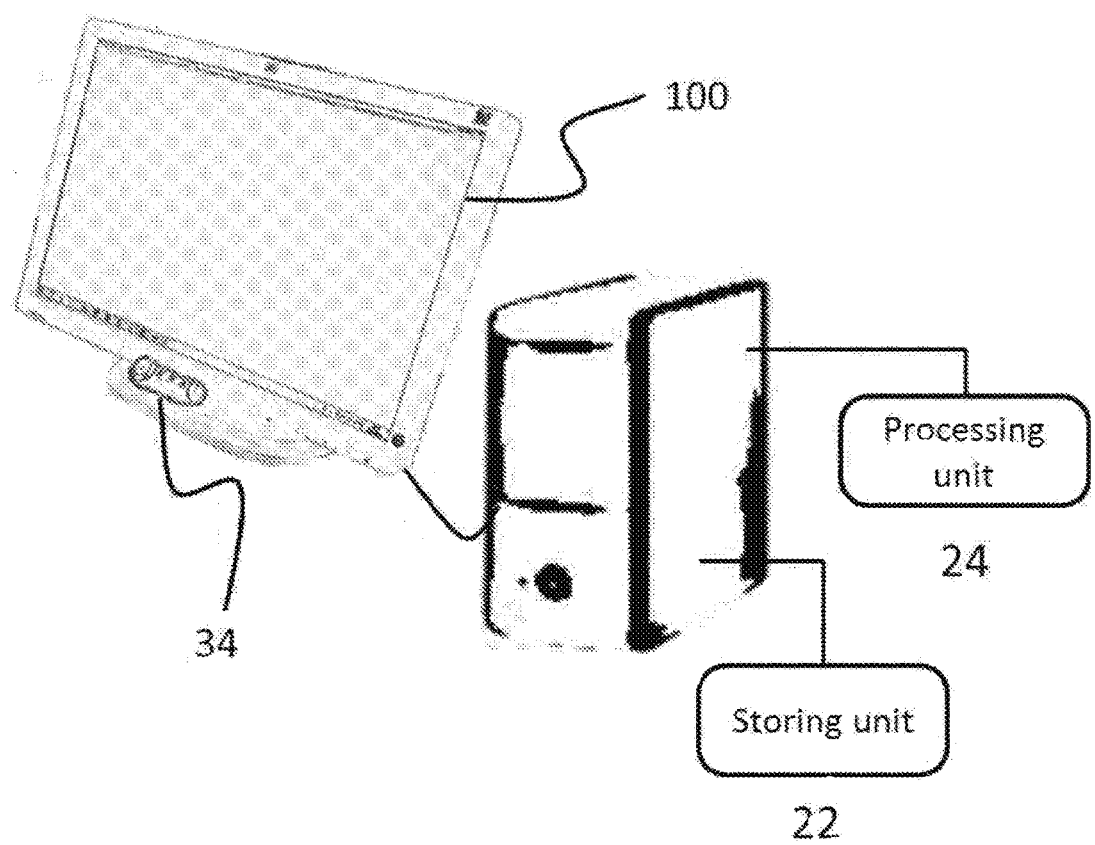
FIG. 10 schematically illustrates a stationary device 20 shown in FIG. 2C according to embodiments.

FIG. 10 illustrates stationary device 20 shown in FIG. 2C. Stationary device 20 consists of storing unit 22, processing unit 24, sensor 34 (2D/3D camera, IR sensor, ultra sonic etc.), and display 100. Sensor 34 captures 3D scene information in front of stationary device 20. Stationary device 20 captures a sequence of query inputs 33 and processes them to retrieve indexable features 36. Storing unit 22 stores the database of annotated gesture images 52, large-scale vocabulary table of indexed features 72, and gesture maps 73. Processing unit 24 performs the method for image query processing 30, and the method for the search engine 70. Processing unit 24 also modifies output visual content (2D/3D) 94 presented on display 100 in response to user gesture 32 performances. Display 100 displays an application running on stationary device 20. Application may include 2D/3D video game, 2D/3D object modeling/rendering, photo browsing, map, navigation etc. presented on display 100. User 10 perceives output visual contents (2D/3D) 94 on the display 100 which are continuously being modified in response to user gesture 32 performances.

Method and Device According to Embodiments

Figure 11A:
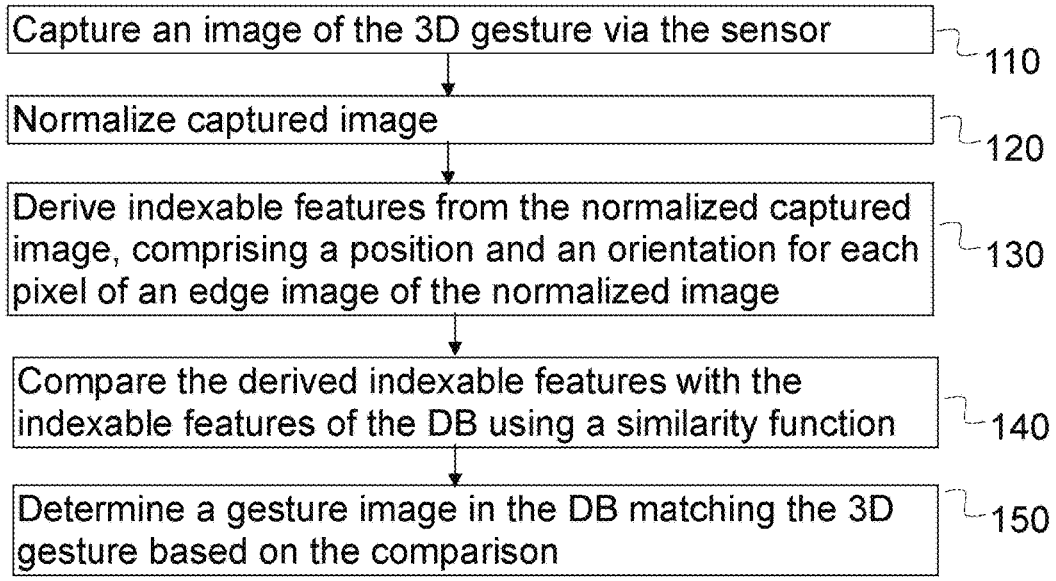
FIG. 11a-11b schematically illustrate the method performed by the device according to embodiments.

The problem of resource demanding computations together with limited power in devices used for real-time gesture recognition is addressed in embodiments of the invention. FIG. 11a is a flow chart illustrating a method for recognizing a 3D gesture according to embodiments. The method is performed in a device 20 having access to a database 52 of gesture images and communicating with a sensor 34. The sensor 34 is adapted to capture an image 33 of the 3D gesture. The sensor may be an integrated part of the device or it may be a separate sensor connectable to the device. The database 52 of gesture images comprises indexable features 54 of normalized gesture images, the indexable features comprising a position and an orientation for each pixel of edge images of the normalized gesture images. The device may comprise a storing unit 22 for storing the database 52 or it may comprise an interface unit for communicating via a remote database node storing the database 52 e.g. via the internet. The method comprises:

110: Capturing an image 33 of the 3D gesture via the sensor 34. In embodiments, capturing the image may comprise capturing a sequence of images of the 3D gesture. The sequence of images may be used to refine the determining of a matching database image, as will be detailed below.

120: Normalizing the captured image. The normalizing may be done in accordance with the normalized gesture images of the database to allow for a comparison. Normalization may comprise resizing the captured image to the size of database images. The database entries are typically normalized to a standard image size such as 320*240 pixels or 640*480 pixels, and therefore the captured image may be normalized to the specific size of the database entries.

130: Deriving indexable features 36 from the normalized captured image 33. The indexable features 36 comprise a position and an orientation for each pixel of an edge image of the normalized captured image.

140: Comparing the derived indexable features 36 with the indexable features derived 54 of the database using a similarity function.

150: Determining a gesture image in the database 52 matching the 3D gesture based on the comparison.

One advantage of using indexable features that comprise a position and an orientation for each pixel of an edge image of the normalized captured image is that it allows for a computational efficient way of recognizing 3D gestures.

Figure 11B:
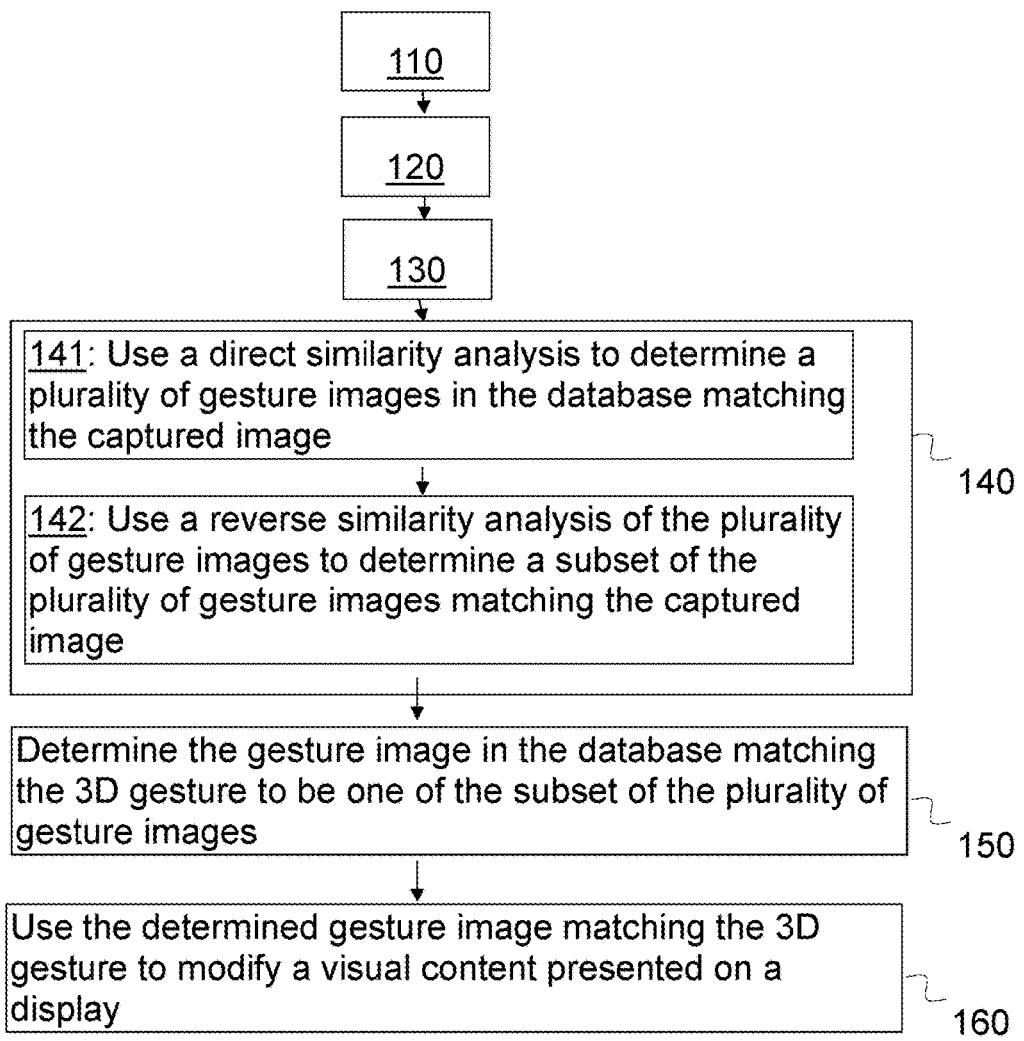

FIG. 11b is a flow chart of the method in the device according to another embodiment. The method comprises the steps described above with reference to FIG. 11a. However, the step of comparing 140 the derived indexable features 36 further comprises:

141: Using a direct similarity analysis to determine a plurality of gesture images in the database matching the captured image; and 142: Using a reverse similarity analysis of the plurality of gesture images to determine a subset of the plurality of gesture images matching the captured image.

In this embodiment, the gesture image in the database 52 matching the 3D gesture is determined 150 to be one of the subset of the plurality of gesture images. However, the step 142 of using the reverse similarity analysis is optional as already described previously. When not performing the reverse similarity analysis, the gesture image in the database 52 matching the 3D gesture is determined 150 to be one of the plurality of gesture images, determined from the direct similarity analysis. The direct and reverse similarity analyses are further described in the subsection "Gesture search engine" above. The reverse similarity analysis 76 may be used for accuracy reasons. However, although not using the reverse similarity analysis would give lower accuracy of retrieval, the advantage is that it reduces the complexity.

The flowchart in FIG. 11b also illustrates that the method may further comprise using 160 the determined gesture image matching the 3D gesture to modify a visual content presented on a display, as have been exemplified e.g. in section "Interface" above.

Two very similar gesture images may not have overlapping edge pixels, but may fall on the neighboring pixels of each other. In order to consider these cases, besides the first step of direct similarity analysis function 75, the first level 8 neighboring and second level 16 neighboring pixels in the database images may be considered when comparing with the captured image. Therefore, in embodiments, the method performed by the device may further comprise:

Deriving additional indexable features comprising a position and an orientation for neighbour pixels of each pixel of the edge image from the normalized captured image; and Comparing the derived additional indexable features with additional indexable features of the database using the similarity function.

The gesture image in the database 52 matching the 3D gesture may then be determined based also on the comparison of the additional indexable features.

Furthermore, the gesture image matching the 3D gesture may be determined based on a gesture map indicating gestures images that are close to each other in a sequence of gesture images. The method in the device may further comprise tracking a user gesture based on the sequence of images, and the gesture image in the database matching the 3D gesture may be determined based also on the tracked user gesture.

In any of the embodiments described above, each entry in the database 52 of gesture images may be tagged with associated 3D motion parameters comprising three orientation and three position parameters. The method may therefore also further comprise retrieving the 3D motion parameters associated with the determined gesture image matching the 3D gesture from the database.

Figure 12:
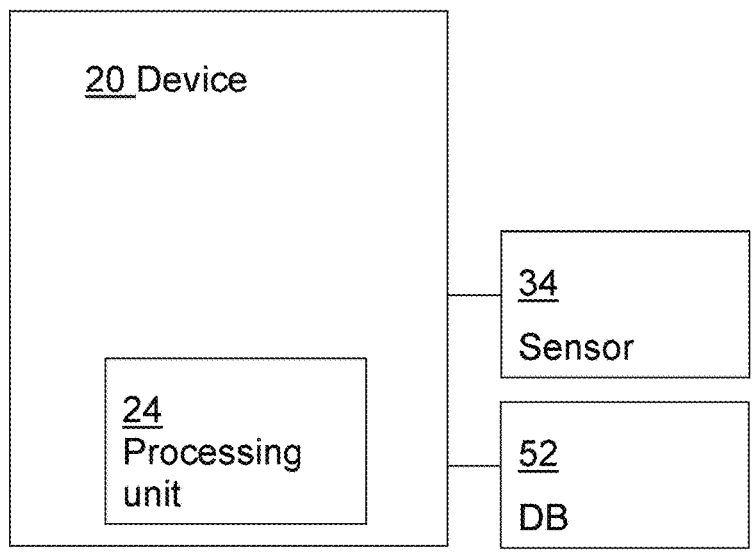
FIG. 12 schematically illustrate the device according to embodiments.

FIG. 12 is a block diagram schematically illustrating the device 20 for recognizing a 3D gesture according to embodiments. The device 20 is configured to have access to a database 52 of gesture images comprising indexable features 54 of normalized gesture images. The indexable features comprise a position and an orientation for each pixel of edge images of the normalized gesture images. The device is connectable to a sensor 34 adapted to capture an image 33 of the 3D gesture. The sensor 34 may be comprised in the device 20, or it may be separate from the device. The device 20 comprises a processing unit 24 adapted to capture the image 33 of the 3D gesture via the sensor, normalize the captured image, and derive indexable features 36 from the normalized captured image 33. The indexable features comprise a position and an orientation for each pixel of an edge image of the normalized captured image. The processing unit 24 is also adapted to compare derived the indexable features 36 with the indexable features 54 of the database using a similarity function, and determine a gesture image in the database 52 matching the 3D gesture based on the comparison.

The processing unit 24 may be further adapted to compare the derived indexable features by using a direct similarity analysis to determine a plurality of gesture images in the database matching the captured image, and to determine the gesture image in the database 52 matching the 3D gesture to be one of the plurality of gesture images.

Furthermore, the processing unit 24 may be further adapted to compare the derived indexable features by using a reverse similarity analysis of the plurality of gesture images to determine a subset of the plurality of gesture images matching the captured image, and to determine the gesture image in the database 52 matching the 3D gesture to be one of the subset of the plurality of gesture images.

In embodiments, the processing unit 24 may be further adapted to derive additional indexable features comprising a position and an orientation for neighbour pixels of each pixel of the edge image from the normalized captured image. The processing unit 24 may be further adapted to compare the derived additional indexable features with additional indexable features of the database using the similarity function, and determine the gesture image in the database 52 matching the 3D gesture based also on the comparison of the additional indexable features.

The processing unit 24 may be further adapted to determine the gesture image matching the 3D gesture based on a gesture map indicating gestures images that are close to each other in a sequence of gesture images. The processing unit 24 may be adapted to capture a sequence of images of the 3D gesture via the sensor 34. In this embodiment, the processing unit may be further adapted to track a user gesture based on the sequence of images, and determine the gesture image in the database 52 matching the 3D gesture based also on the tracked user gesture.

The processing unit 24 may be further adapted to use the determined gesture image matching the 3D gesture to modify a visual content presented on a display. Furthermore, each entry in the database 52 of gesture images may be tagged with associated 3D motion parameters comprising three orientation and three position parameters, and the processing unit 24 may be further adapted to retrieve 3D motion parameters associated with the determined gesture image matching the 3D gesture from the database 52.

The device 20 may in embodiments comprise a memory containing instructions executable by said processing unit 24 whereby the device is operative to capture the image of the 3D gesture via the sensor, normalize the captured image in accordance with the normalized gesture images of the database, derive indexable features from the normalized captured image, compare the derived indexable features with the indexable features of the database using a similarity function, and determine a gesture image in the database matching the 3D gesture based on the comparison. The device 20 may also comprise an interface circuit connected to the processing unit 24 and configured to communicate with the sensor 34 and/or the database 52.

In an alternative way to describe the embodiment in FIG. 12, the device 20 may comprise means for capturing the image of the 3D gesture via the sensor, means for normalizing the captured image in accordance with the normalized gesture images of the database, means for deriving indexable features from the normalized captured image, means for comparing the derived indexable features with the indexable features of the database using a similarity function, and means for determining a gesture image in the database matching the 3D gesture based on the comparison. The means described are functional units which may be implemented in hardware, software, firmware or any combination thereof. In one embodiment, the means are implemented as a computer program running on a processor.

In still another alternative way to describe the embodiment in FIG. 12, the device 20 may comprise a Central Processing Unit (CPU) which may be a single unit or a plurality of units. Furthermore, the device 20 may comprise at least one computer program product (CPP) in the form of a non-volatile memory, e.g. an EEPROM (Electrically Erasable Programmable Read-Only Memory), a flash memory or a disk drive. The CPP may comprise a computer program, which comprises code means which when run on the CPU of the device 20 causes the device 20 to perform the methods described earlier in conjunction with FIG. 11*a-b*. In other words, when said code means are run on the CPU, they correspond to the processing unit 24 in FIG. 12.

The above mentioned and described embodiments are only given as examples and should not be limiting. Other solutions, uses, objectives, and functions within the scope of the accompanying patent claims may be possible.

The invention claimed is:

1. A method for recognizing a three dimensional, 3D, gesture, the method being performed in a device (20) having access to a database (52) of gesture images, the device communicating with a sensor (34) adapted to capture an image (33) of the 3D gesture, wherein the database (52) of gesture images comprises indexable features (54) of normalized gesture images, the indexable features comprising a position and an orientation for each pixel of edge images of the normalized gesture images, the method comprising:

capturing (110) the image (33) of the 3D gesture via the sensor, normalizing (120) the captured image in accordance with the normalized gesture images of the database (52) to allow for a comparison, deriving (130) indexable features (36) from the normalized captured image (33), the indexable features (36) comprising a position and an orientation for each pixel of an edge image of the normalized captured image, comparing (140) the derived indexable features (36) with the indexable features (54) of the database using a similarity function, and determining (150) a gesture image in the database (52) matching the 3D gesture based on the comparison; wherein each entry in the database (52) of gesture images is tagged with associated 3D motion parameters comprising three orientation and three position parameters, the method further comprising:

retrieving 3D motion parameters associated with the determined gesture image matching the 3D gesture from the database (52).

2. The method according to claim 1, wherein comparing (140) the derived indexable features further comprises:

using (141) a direct similarity analysis to determine a plurality of gesture images in the database matching the captured image, and wherein the gesture image in the database (52) matching the 3D gesture is determined (150) to be one of the plurality of gesture images.

3. The method according to claim 2, wherein comparing (140) the derived indexable features further comprises:

using (142) a reverse similarity analysis of the plurality of gesture images to determine a subset of the plurality of gesture images matching the captured image, and wherein the gesture image in the database (52) matching the 3D gesture is determined (150) to be one of the subset of the plurality of gesture images.

4. The method according to claim 1, further comprising:

deriving additional indexable features comprising a position and an orientation for neighbour pixels of each pixel of the edge image from the normalized captured image, comparing the derived additional indexable features with additional indexable features of the database using the similarity function, and wherein the gesture image in the database (52) matching the 3D gesture is determined based also on the comparison of the additional indexable features.

5. The method according to claim 1, wherein the gesture image matching the 3D gesture is determined based on a gesture map indicating gestures images that are close to each other in a sequence of gesture images.

6. The method according to claim 1, wherein capturing (110) the image comprises capturing a sequence of images of the 3D gesture.

7. The method according to claim 6, further comprising:

tracking a user gesture based on the sequence of images, and wherein the gesture image in the database (52) matching the 3D gesture is determined based also on the tracked user gesture.

8. The method according to claim 1, further comprising:

using (160) the determined gesture image matching the 3D gesture to modify a visual content presented on a display.

9. A device (20) for recognizing a three dimensional, 3D, gesture, the device being configured to have access to a database (52) of gesture images comprising indexable features (54) of normalized gesture images, the indexable features comprising a position and an orientation for each pixel of edge images of the normalized gesture images, the device being connectable to a sensor (34) adapted to capture an image (33) of the 3D gesture, and the device comprising a processing unit (24) adapted to:

capture the image (33) of the 3D gesture via the sensor (34), normalize the captured image in accordance with the normalized gesture images of the database (52)) to allow for a comparison, derive indexable features (36) from the normalized captured image (33), wherein the indexable features (36) comprise a position and an orientation for each pixel of an edge image of the normalized captured image, compare the derived indexable features (36) with the indexable features (54) of the database using a similarity function, and determine a gesture image in the database (52) matching the 3D gesture based on the comparison; wherein each entry in the database (52) of gesture images is tagged with associated 3D motion parameters comprising three orientation and three position parameters, the processing unit (24) being further adapted to:

retrieve 3D motion parameters associated with the determined gesture image matching the 3D gesture from the database (52).

10. The device (20) according to claim 9, wherein the processing unit (24) is further adapted to compare the derived indexable features by:

using a direct similarity analysis to determine a plurality of gesture images in the database matching the captured image, the processing unit (24) being further adapted to determine the gesture image in the database (52) matching the 3D gesture to be one of the plurality of gesture images.

11. The device (20) according to claim 10, wherein the processing unit (24) is further adapted to compare the derived indexable features by:

using a reverse similarity analysis of the plurality of gesture images to determine a subset of the plurality of gesture images matching the captured image, the processing unit (24) being further adapted to determine the gesture image in the database (52) matching the 3D gesture to be one of the subset of the plurality of gesture images.

12. The device (20) according to claim 9, wherein the processing unit (24) is further adapted to:

derive additional indexable features comprising a position and an orientation for neighbour pixels of each pixel of the edge image from the normalized captured image, compare the derived additional indexable features with additional indexable features of the database using the similarity function, and determine the gesture image in the database (52) matching the 3D gesture based also on the comparison of the additional indexable features.

13. The device (20) according to claim 9, wherein the processing unit (24) is further adapted to determine the gesture image matching the 3D gesture based on a gesture map indicating gestures images that are close to each other in a sequence of gesture images.

14. The device (20) according to claim 9, wherein the processing unit (24) is further adapted to capture a sequence of images of the 3D gesture via the sensor (34).

15. The device (20) according to claim 14, wherein the processing unit (24) is further adapted to:
track a user gesture based on the sequence of images, and
determine the gesture image in the database (52) matching the 3D gesture based also on the tracked user gesture.

16. The device (20) according to claim 9, wherein the processing unit (24) is further adapted to:
use the determined gesture image matching the 3D gesture to modify a visual content presented on a display.

17. The method according to claim 2, further comprising:
deriving additional indexable features comprising a position and an orientation for neighbour pixels of each pixel of the edge image from the normalized captured image,
comparing the derived additional indexable features with additional indexable features of the database using the similarity function,
and wherein the gesture image in the database (52) matching the 3D gesture is determined based also on the comparison of the additional indexable features.

18. The method according to claim 3, further comprising:
deriving additional indexable features comprising a position and an orientation for neighbour pixels of each pixel of the edge image from the normalized captured image,
comparing the derived additional indexable features with additional indexable features of the database using the similarity function,
and wherein the gesture image in the database (52) matching the 3D gesture is determined based also on the comparison of the additional indexable features.

19. The device (20) according to claim 10, wherein the processing unit (24) is further adapted to:
derive additional indexable features comprising a position and an orientation for neighbour pixels of each pixel of the edge image from the normalized captured image,
compare the derived additional indexable features with additional indexable features of the database using the similarity function, and
determine the gesture image in the database (52) matching the 3D gesture based also on the comparison of the additional indexable features.

20. The device (20) according to claim 11, wherein the processing unit (24) is further adapted to:
derive additional indexable features comprising a position and an orientation for neighbour pixels of each pixel of the edge image from the normalized captured image,
compare the derived additional indexable features with additional indexable features of the database using the similarity function, and
determine the gesture image in the database (52) matching the 3D gesture based also on the comparison of the additional indexable features.

* * * * *